(12) United States Patent
Koehler (10) Patent No.: US 8,174,612 B1
(45) Date of Patent: May 8, 2012

(54) IMAGING DEVICE

(76) Inventor: Steve Koehler, Northridge, CA (US)

( * ) Notice: Subject to any disclaimer, the term of this patent is extended or adjusted under 35 U.S.C. 154(b) by 438 days.

(21) Appl. No.: 12/462,774

(22) Filed: Aug. 10, 2009

Related U.S. Application Data

(60) Provisional application No. 61/088,043, filed on Aug. 12, 2008.

(51) Int. Cl.
*H04N 5/225* (2006.01)
*H04N 5/222* (2006.01)
(52) U.S. Cl. ............ 348/373; 348/333.06; 348/50; 248/292.12
(58) Field of Classification Search ............ 348/36, 348/37, 50, 333.06, 373
See application file for complete search history.

(56) References Cited

U.S. PATENT DOCUMENTS

| | | | | |
|---|---|---|---|---|
| 3,638,502 | A * | 2/1972 | Leavitt et al. | 74/5.34 |
| 5,627,616 | A * | 5/1997 | Sergeant et al. | 396/427 |
| 6,503,000 | B1 * | 1/2003 | Kim | 396/427 |
| 7,364,128 | B2 * | 4/2008 | Donaldson et al. | 248/292.12 |
| 7,940,299 | B2 * | 5/2011 | Geng | 348/143 |
| 7,955,006 | B1 * | 6/2011 | Harvey | 396/428 |
| 2010/0231713 | A1 * | 9/2010 | Oyabu et al. | 348/143 |

* cited by examiner

*Primary Examiner* — Hung Lam
(74) *Attorney, Agent, or Firm* — Robert M. Sperry (57) ABSTRACT

Improved methods and apparatus for imaging comprising a base, an outer dome mounted on said base, a central shaft intersecting said base, an imaging array including at least one imaging chip mounted on said shaft, means for focusing light onto said imaging chip having at least one pixel, at least one signal processing system, means for rotating said shaft, and means for transmitting data from said imaging chip to said signal processing system and from said signal processing system to an external receiver.

10 Claims, 11 Drawing Sheets

FIG. 10A
IMAGING CHIP AND
CHANNEL SEAM SIDE VIEW

FIG. 10B
IMAGING CHIP AND
CHANNEL SEAM FRONT
EXPLODED/SPLIT VIEW

IMAGING DEVICE

RELATED CASES

This invention is described in my Provisional Application Ser. No. 61/088,043, filed Aug. 12, 2008.

FIELD OF THE INVENTION

This invention relates to the field of imaging and more particularly to an imaging device and a method for forming an image.

BACKGROUND

Imaging devices and cameras which develop 360 degree views, e.g. panoramic imaging systems, are currently known. Such systems provide a relatively wide field of view and may be used for a variety of different purposes. Such applications include, but are not limited to, the areas of surveillance, robotics and machine vision.

In general, such devices are capable of imaging a wide angle of a scene. The wide angle may be up to approximately 360 degrees as measured both an azimuth and an elevation. Often, these devices require the use of multiple cameras, where the cameras are spaced apart, such that each camera may effectively capture a portion of a scene, which may or may not be reflected off of a mirrored surface. Additional methods which may be utilized to capture a wide field of view include, for example, convex mirrors, coupled with image processing algorithms, fish eye lenses or single cameras with conventional lenses that rotate. The use of such systems often requires mechanical means necessary to focus or zoom on an object.

However, it would be desirable to provide an imaging device which is capable of producing a 360 degree by 180 degree view or greater, without the necessity for lenses or mirrors that focus or require multiple optical elements.

BRIEF SUMMARY AND OBJECTS OF INVENTION

These disadvantages of the prior art are overcome with the present invention and an improved method and apparatus for imaging are provided which permit imaging a full field of view of a hemisphere or full sphere in real time without the use of mirrors.

These advantages of the present invention are preferably attained by providing which permit imaging a full field of view of a hemisphere or full sphere in real time without the use of mirrors.

Accordingly, it is an object of the present invention to provide improved methods and apparatus for imaging.

Another object of the present invention is to provide improved methods and apparatus for imaging which permit imaging a full field of view of a hemisphere or full sphere in real time without the use of mirrors.

A further object of the present invention is to provide which permit imaging a full field of view of a hemisphere or full sphere in real time without the use of mirrors.

A specific object of the present invention is to provide improved methods and apparatus for imaging comprising a base, an outer dome mounted on said base, a central shaft intersecting said base, an imaging array including at least one imaging chip mounted on said shaft, means for focusing light onto said imaging chip having at least one pixel, at least one signal processing system, means for rotating said shaft, and means for transmitting data from said imaging chip to said signal processing system and from said signal processing system to an external receiver.

These and other objects and features of the present invention will be apparent from the following detailed description, taken with reference to the figures of the accompanying drawing.

GLOSSARY

The term "field of view", as used herein, shall mean an area which a camera can see at any given moment or as a result of movement of the imaging device in a manner similar to a flatbed scanner to build and image which includes an entire field of view.

The term "frames per second", as used herein, shall mean the number of full pictures that are taken by an imaging device per second.

The term "photo element", as used herein, shall mean a region on an imaging chip that creates an individual pixel. It can be a photo capacitor, a photo transistor or photo diode and is synonymous to a pixel when referring to an imaging chip, such as a CCD.

The term "circle of confusion", as used herein, shall mean an optical spot caused by a cone of light rays from a lens which does not come to a perfect focus when imaging a point source.

The term "hemispherical imaging array", as used herein, shall mean a combination of a printed circuit board and reinforced fiberglass mount that holds multiple imaging chips, processing circuitry for the imaging chips with other support circuitry, corrective lens and SEAM. It is a rotating part that has a central axis which divides the mount into two sections, in most cases, only 90 degrees of the hemisphere will have imaging chips.

The term "positional feedback", as used herein, shall mean a means of obtaining an exact position from a motor. The system works almost identically to a computer hard drive in that the position of the motor, at all times, is known and is reading data from that position. In the case of a hard drive, it is a magnetic medium.

The term "real time image", as used herein, shall mean a rate of 1 or more FPS (frames per second) for the total field of view, which is 360 degrees of rotation.

The term "Imaging device", as used herein, shall mean any device that converts light within a bandwidth of from 1 micrometer in wavelength (infrared) to 100 nm in wavelength (ultraviolet), including the visible spectrum, into an electrical signal for the purpose of creating image or light analysis.

DETAILED DESCRIPTION OF THE INVENTION

Figure 1A:
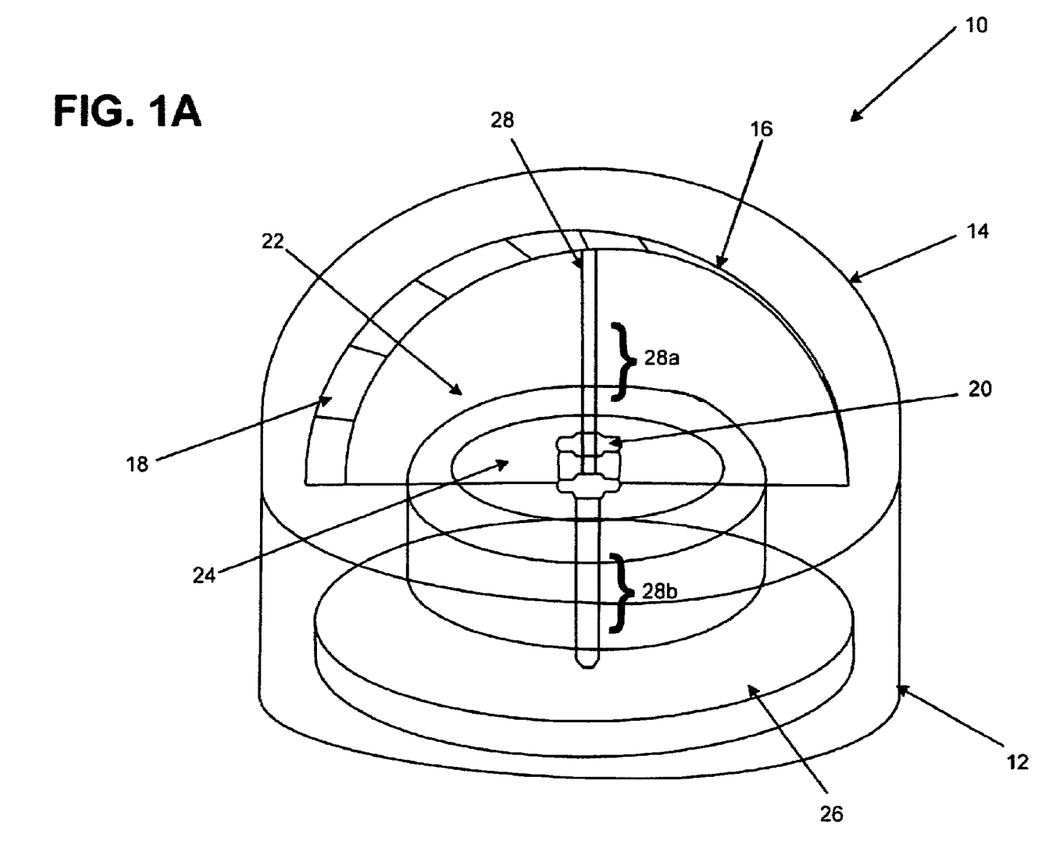
FIG. 1A is perspective view of a camera in accordance with an embodiment of the present invention.

In that form of the present invention chosen for purposes of illustration, FIG. 1A shows a hemispherical configuration of an imaging device 10 having an outer shell base 12 with a dome 14. Within the dome 12 is a hemispherical imaging array 16 which provides a first processing component (not shown) comprising a system for imaging and signal processing and rotation mount for the imaging charged couple devices (CCDs) or chips 18. In one embodiment, one or more slip rings 20, for operational power or optional video information or signals, are operably coupled to a central shaft 28, having an upper rotating portion 28a and a lower stationary portion 28b, and which is hollow to accommodate cable. A fiber optic transmitter 29 (not shown) is mounted inside shaft 28 on the upper rotational portion 28a. A fiber optic receiver 31 (not shown) is mounted inside the lower portion 28b of the shaft 28.

In another embodiment, one or more light rings 24, for sending a signal via a series of light receivers rather than by the slip rings 20, are provided. The device, in some embodiments, may only use a series of slip rings 20 to transmit power and electrical signals, in lieu of the fiber optic transmitter 29, fiber optic receiver 31 or the light rings 24. A motor 22 rotates the imaging PCB and imaging chips 18. A second processing component 26, comprising a system from motor positioning, drive circuitry and digital signal processing (DSP) is located near the base 12 of the device 10. In one embodiment, the second processing system 26 can contain driver signals for imaging chips 18 and raw video signals, which can be optically linked to the second processing system 26 or sent through slip rings 20.

Figure 1B:
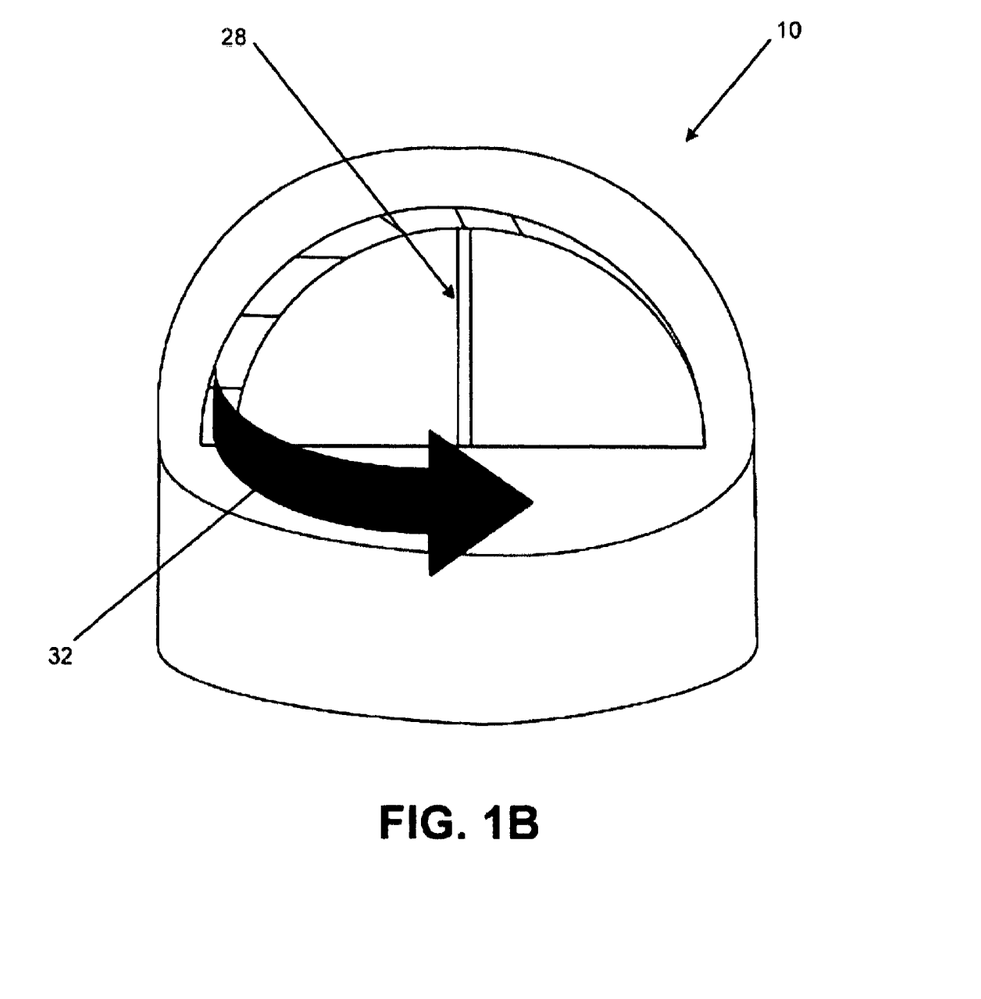
FIG. 1B is a perspective view of the direction of rotation of the imaging device of FIG. 1A.
Figure 3:
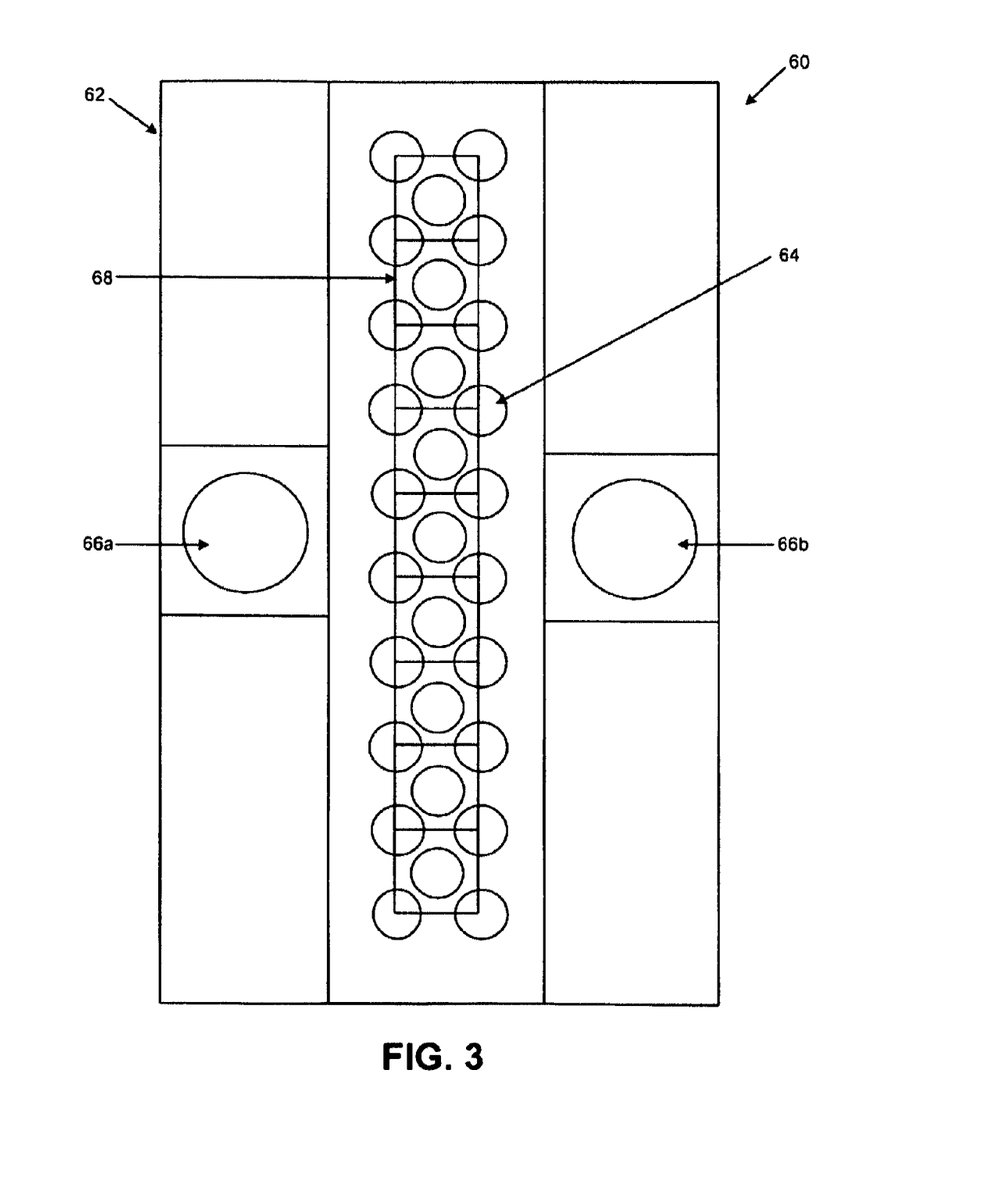
FIG. 3 is a schematic view of a SEAM in accordance with an embodiment of the present invention.

FIG. 1B shows the direction of rotation 32 of the imaging device 10 around the central shaft 28. Each imaging photo element or pixel (See FIG. 3) is assigned a particular latitude of rotation. Within the 180 degree field of view, there can be at least 200 pixels. As the imaging device 10 rotates, each single point of light in a 360×180 degree hemisphere is scanned to form an image. The field of view can be expanded by increasing the number of imaging chips 18, increasing the arc of the dome 14 or placing the imaging device 10 on a stalk.

Figure 2:
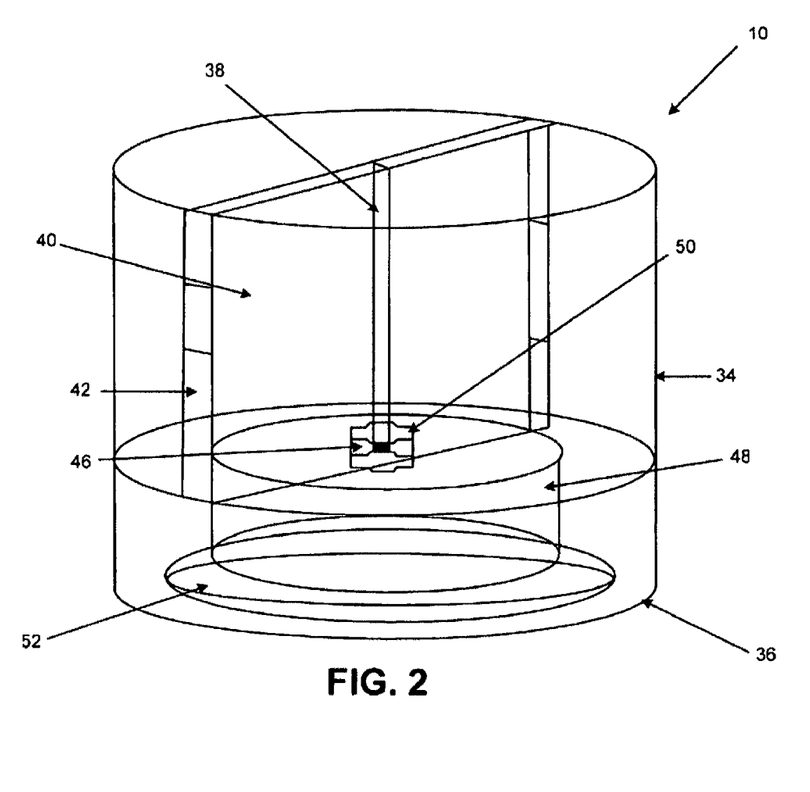
FIG. 2 is a perspective view of an imaging device in accordance with another embodiment of the present invention.

In another embodiment, as illustrated in FIG. 2, the imaging device 10 comprises a cylindrical configuration, having an outer dome 34 mounted on a base 36 and intersected by a central shaft 38. A first processing system 40, with circuitry for the support of the imaging devices 42 and data processing, is affixed in a vertical position within the dome 34. Located at the base of the central shaft 38 is a bearing 46, which serves to support the shaft 38. One or more slip rings 50 are positioned around the bearing 46. A second processing system 52, with DSP or other imaging processing, is located near the base of the device 10. The second processing system 52 can also include motor drivers and power regulation.

Operationally, images are captured by one or more single element aperture masks (SEAM) 60. The SEAM serves to focus light onto an imaging chip by restricting the field of view and reducing the circle of confusion for each pixel of an imaging device. This can be accomplished by having a single or limited number of holes from which a single pixel receives only light passing through a single or limited number of apertures in the SEAM 60. There is illustrated, in FIG. 3, one embodiment of the SEAM 60 comprising a plate 62 having at least one aperture 64 per pixel 68 and mounting holes 66a, 66b for attaching the SEAM 60 to the imaging device 10. In the embodiment illustrated, imaging chip pixels 68 are 10 microns in size, apertures 64 are 6 microns and the SEAM 60 will be aligned perpendicular to the pixel 68 of the imaging chip.

Figure 10A:
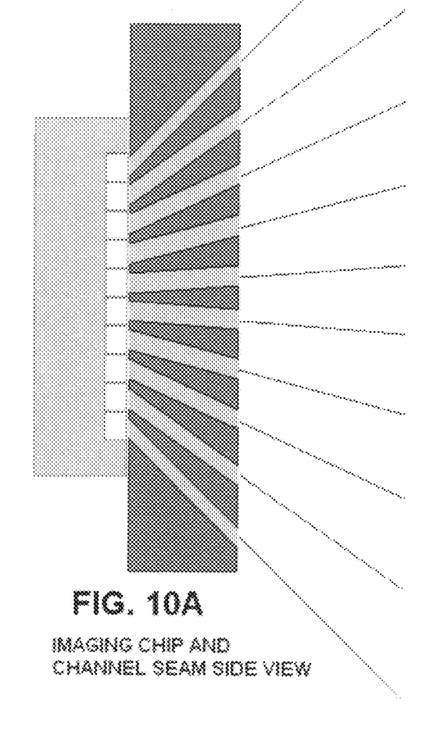
FIG. 10A is a side view of an alternative SEAM assembly which does not require a corrective lens.
Figure 10B:
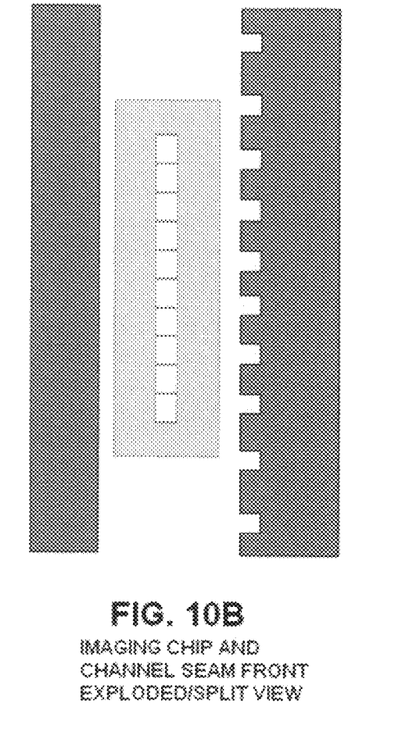
FIG. 10B is a front view of an alternative SEAM assembly which does not require a corrective lens, the SEAM being split into two halves in an exploded view, so that the imaging chip can also be seen.

The SEAM 60 is formed by drilling at least one aperture 64 into plate 62. Plate 62 can be from about 0.05 to about 0.5 inches in thickness and can be formed of a ceramic or metal material, such as aluminum or copper, and the like. Apertures 64 can be from about 5 to about 50 microns in size, as determined by the size of the pixels 68 of the imaging device utilized. The diameter of an aperture 64 is determined by the size of a single pixel 68 and will range in size from about half the size of an individual pixel up to 5 pixels 68. A variation of construction can also have the apertures 64 formed by channels into a material then fully assembled after the channels are manufactured, resulting in holes with the desired angle and depth. An alternate embodiment of the SEAM, seen in FIG. 10, shows the apertures 64 varying in angle to the individual pixels 68 of an imaging chip 18. This alternative may not require any form of corrective lens, however, light will not always be entering the individual pixels 68 of the imaging chip 18 at a perpendicular angle to the chip 18 and pixels 68 thereof.

A additional alternative of the SEAM 60 can employ a series of micro-fiber optics which would produce the identical effect of the reduction of the circle of confusion. This would also have the benefit of limiting the angle at which light is received onto the imaging chip 18, again accomplishing the goal of the SEAM. In the case of this variation, glass of other light conductive (transparent) material simply takes the place of the air or vacuum that is present in the SEAM itself.

Figure 4A:
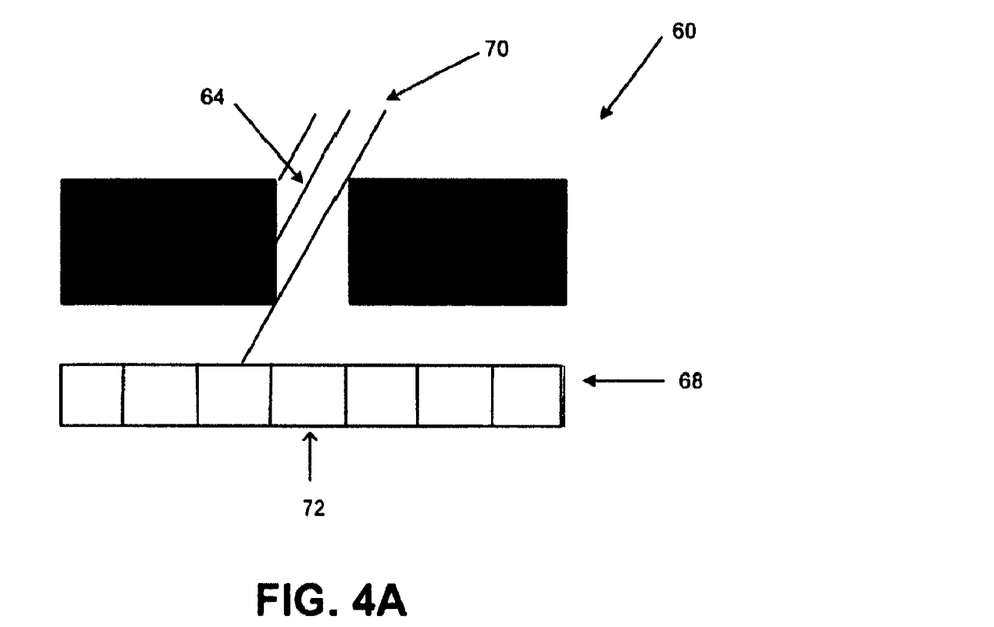
FIGS. 4A-4C illustrate introduction of light at various angles to a photo element on an imaging chip with a SEAM in accordance with an embodiment of the present invention.
Figure 4B:
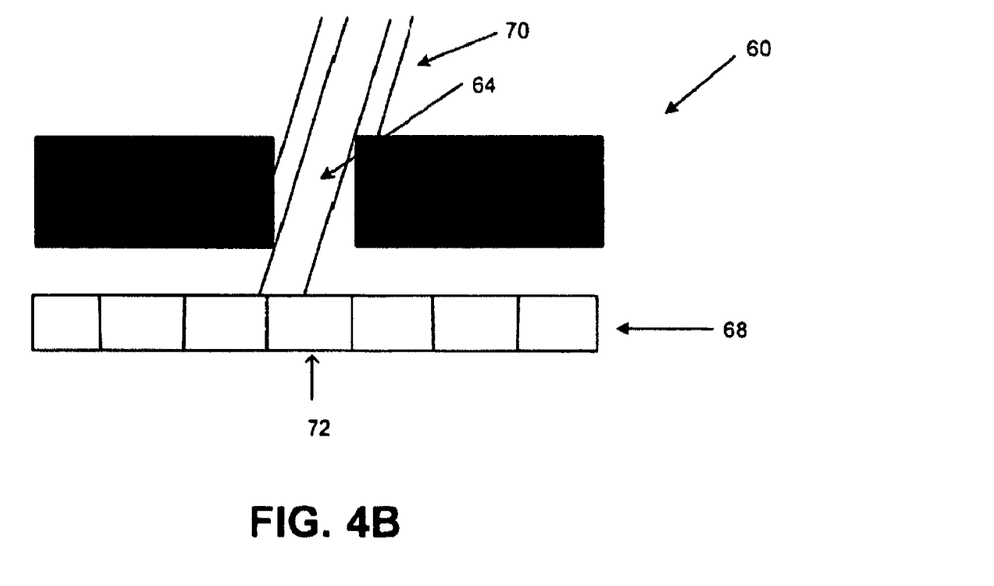
Figure 4C:
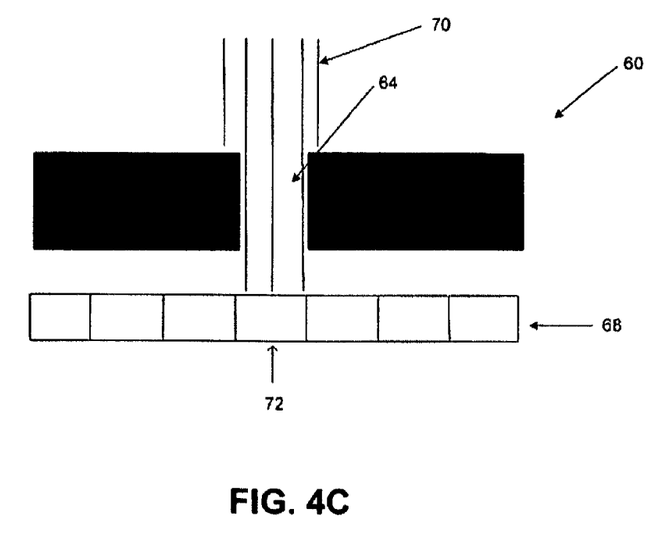

In FIGS. 4A-4C, there are illustrated examples of the introduction of light rays 70 at various angles to a photoelement 72 on an imaging chip (not shown) with a SEAM 60. Preferably, light passing through as aperture 64 in the SEAM 60 will be aligned perpendicular to the pixel 68 of the imaging chip. Thus, by having each individual photo diode on an imaging chip sampling light from a particular angle, at a particular moment, each pixel 68 is pointed are such an angle as to scan every vertical line possible, thus allowing for increased vertical resolution, e.g. in the thousands of pixels 68 of vertical lines.

In one embodiment, imaging chips 18 are curved to fit an arc required for each pixel to scan an individual latitude. By "latitude, it is meant the location of a pixel on a y axis, which is also in conjunction with the central shaft 28 of the imaging device 10.

Figure 5A:
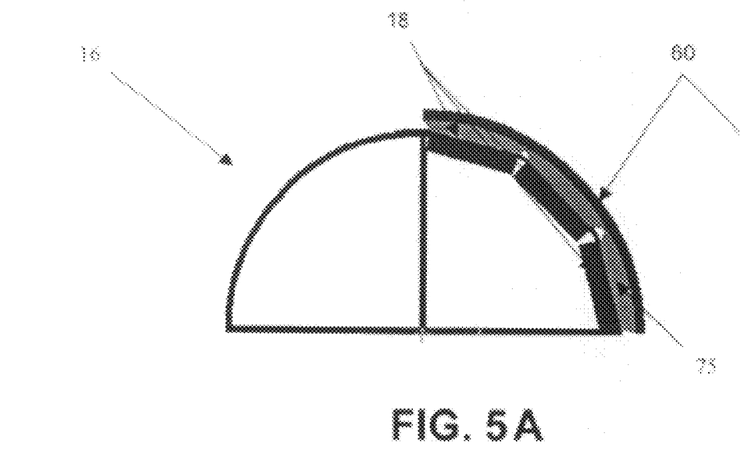
FIG. 5A is a perspective view of an imaging device according to an embodiment of the present invention including image sensors, a corrective lens and a SEAM assembly.
Figure 5B:
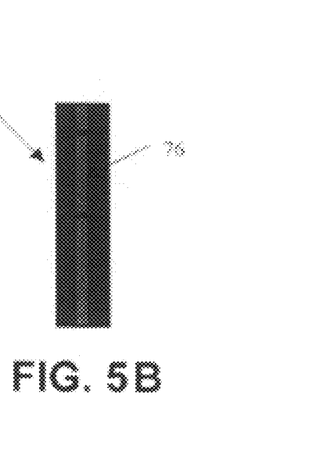
FIG. 5B is an end view of the imaging device of FIG. 5A.

So that the imaging device 10 can aim each pixel 68 at a subdivision of a degree of the minimum 90 degree arc, a corrective lens 75 (FIG. 5) is interposed between the SEAM 60 and imaging chips 18 in order to direct pixels (not shown)

to the angle required to scan in order to develop an image. Apertures 64 (not shown) are located along the outer edge 76 of the SEAM 60. The chip 18/lens 75/SEAM 60 combination will be referred to herein as a "SEAM assembly" 78. The lens 75 redirects light from entering from an angle into a photo element on the imaging chip 18, such that it is perpendicular to the imaging chip 18. It is contemplated that each imaging chip 18 be offset laterally in order to allow for overlap of scanning of each imaging/optical/SEAM assembly 78.

Figure 6:
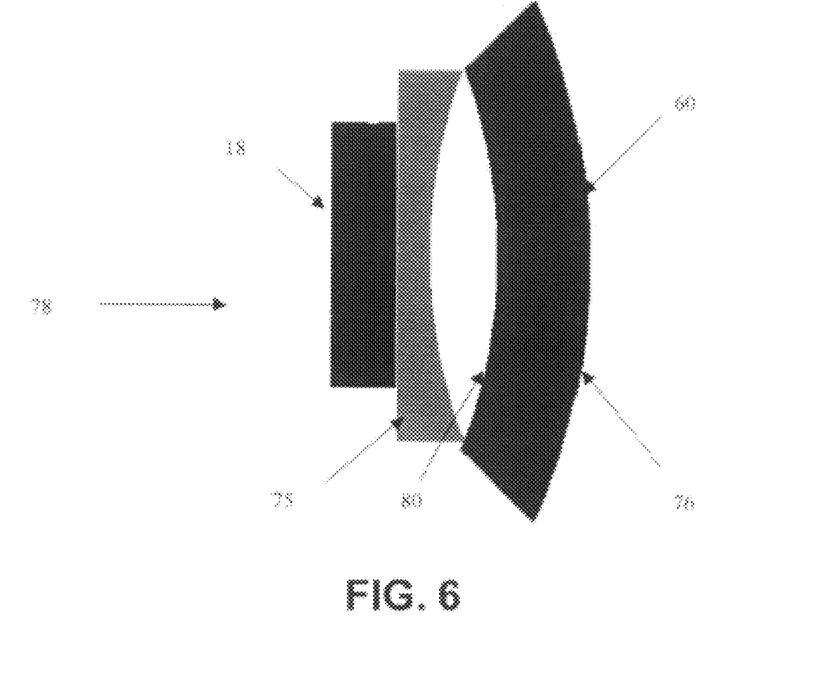
FIG. 6 is an exploded view of an imaging chip, lens and SEAM assembly according to an embodiment of the present invention.
Figure 7:
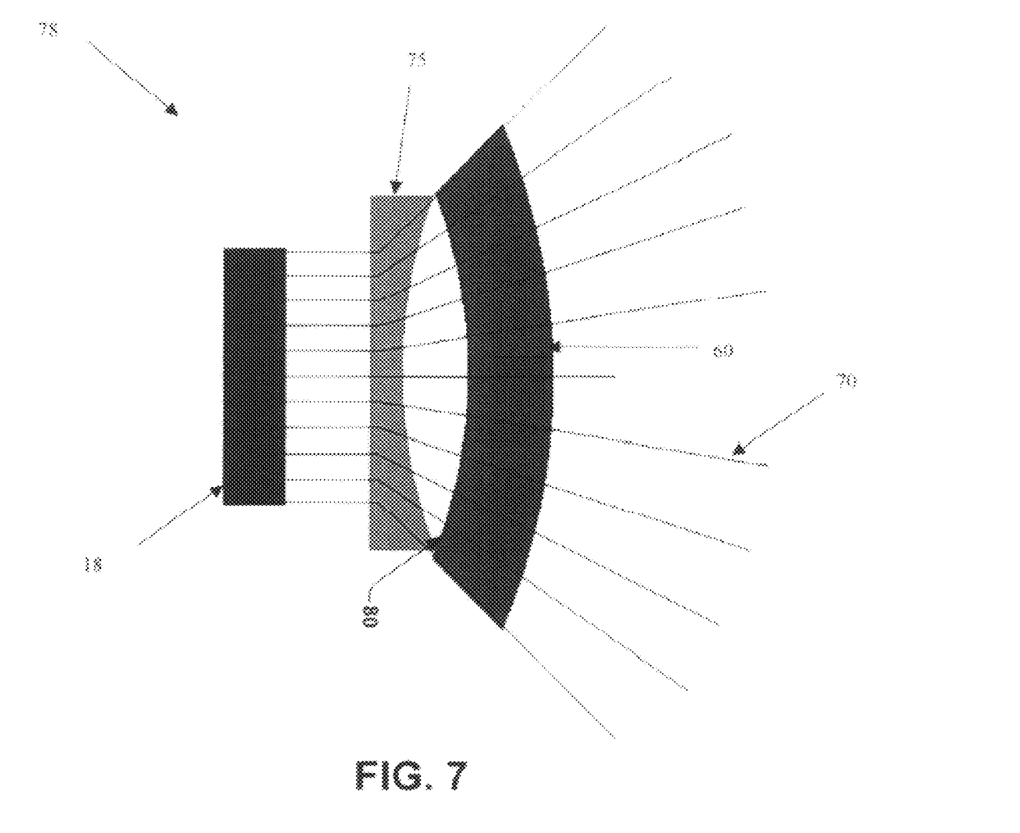
FIG. 7 is a perspective view of light rays from a source entering a SEAM assembly according to an embodiment of the present invention.

Referring to FIG. 7, there is shown an exploded view of the SEAM assembly 78 of FIG. 6, including imaging chips 18, corrective lens 75 and SEAM 60. Apertures 64 (not shown) in the SEAM 60 can be aligned along a curved surface, but will remain perpendicular to the circumference of the outer edge 76 of the SEAM 60, as well as the inner edge 80/Light rays 70 passing through the SEAM 60 pass through apertures 64 (not shown) in the SEAM 60. The corrective lens 75 changes the angle of the light rays 70 to be perpendicular to a pixel (not shown) on the imaging chip 18, as shown in FIG. 7.

Figure 8:
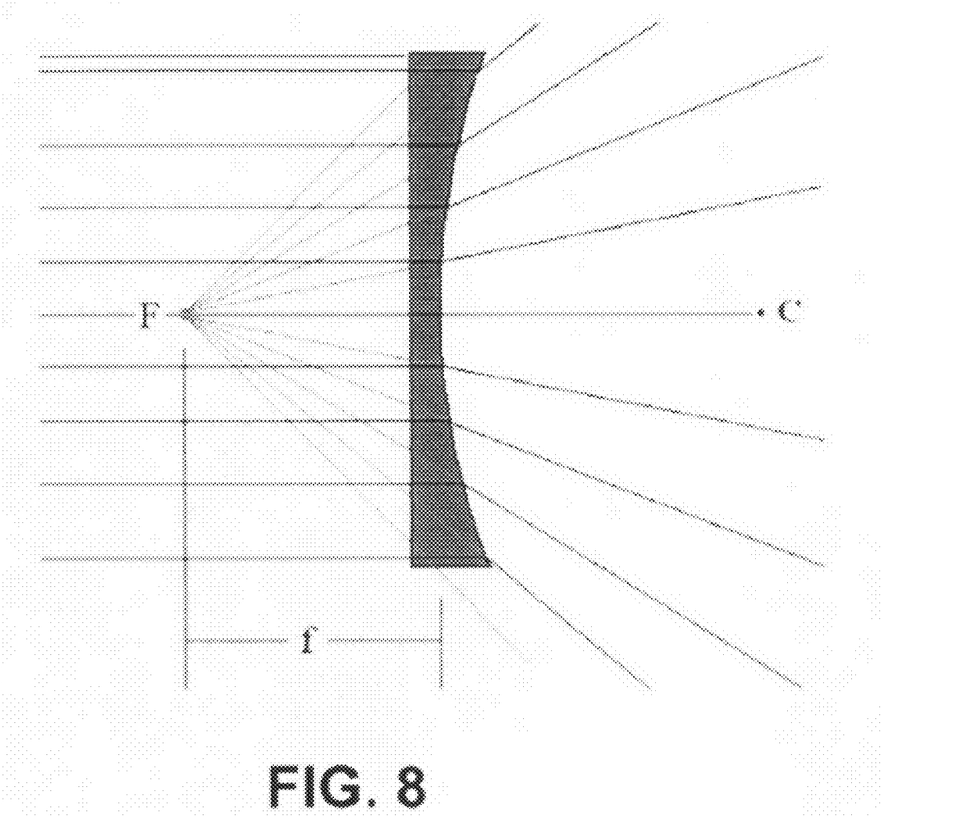
FIG. 8 is a perspective view of the operation of the corrective lens according to an embodiment of the present invention.
Figure 9:
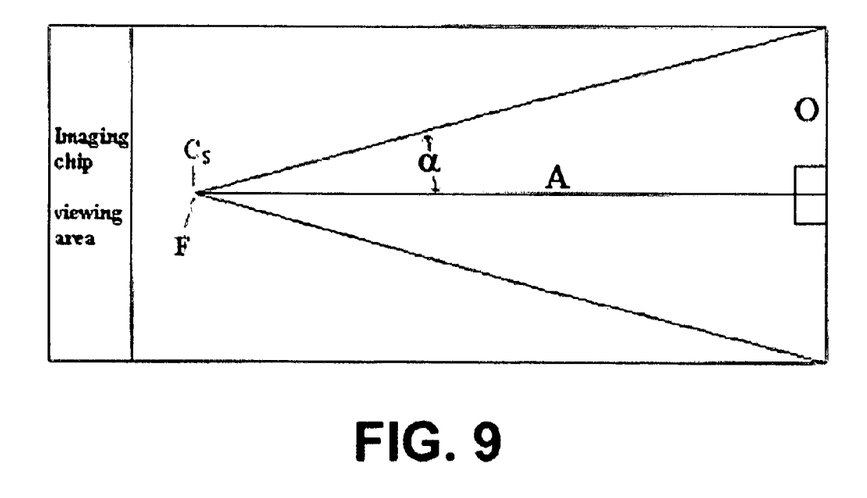
FIG. 9 is a diagrammatic representation of a plano-concave lens for a SEAM assembly according to an embodiment of the present invention.

In FIGS. 5-7, in one embodiment, the corrective lens 78 is illustrated as a plano-concave lens. In normal operation, light enters the plano-concave lens 78 from the flat side and is then dispersed according to the center of the radius (R1) to the curved side of the lens and the refraction factor of the material being used (n). According to an embodiment of the present invention, the light rays 70 enter the lens 75 from the curved side and, rather than being dispersed, are turned into a series of parallel beams, allowing for maximum absorption of light for each pixel of an area or imaging chip 18, as shown in FIG. 8. In FIG. 8, "F" is the focal point, "f" is the focal length and "C" is the center of the lens. The focal point of the plano-concave lens can thus be determined according to:

$$1/F=(n-1)\cdot(1/R)$$

Where F is the focal point of the lens
n is the refractive index of the lens material; and
$R_1$ is the radius of one side of the lens;

A design of a plano-concave lens 78 for a SEAM 60 and imaging chip 18 of the invention can be determined with reference to FIG. 9 and the following formulas. In one implementation, as illustrated in FIG. 9, the following parameters may be utilized:

A is the distance of the focal point of the SEAM assembly;
a is the angle)(90°/number of the imaging chips/2;
O is the imaging area/2;
$C_s$ is the center of the radius of the SEAM;
F is the focal point of the lens; and
$R_L$ is the radius of the lens.

Thus, the distance of the focal point of the assembly may be determined according to:

$$A=O/\tan(a)$$

Such that A is equal to $C_s$ which is equal to F according to:

$$A=C_s=F$$

Then $R_L=A\cdot(n-1)$

Obviously, numerous other variations and modifications can be made without departing from the spirit of the present invention. Therefore, it should be clearly understood that the forms of the present invention described above and shown in the figures of the accompanying drawing are illustrative only and are not intended to limit the scope of the present invention.

What is claimed is:

1. An imaging device comprising:
   a base,
   an outer dome mounted on said base,
   a central shaft intersecting said base,
   an imaging array including at least one imaging chip mounted on said shaft,
   means for focusing light onto said imaging chip having at least one pixel,
   at least one signal processing system,
   means for rotating said shaft, and
   means for transmitting data from said imaging chip to said signal processing system and from said signal processing system to an external receiver, and
   wherein:
   said focusing means includes a corrective lens having a focal point determined by $$1/F=(n-1)\cdot(1/R)$$

where F is the focal point of the lens, n is the refractive index of the lens material, and R is the radius of one side of the lens.

2. The imaging device of claim 1 wherein:
   there are two signal processing systems;
   one of said signal processing systems serving to process signals from said imaging chip,
   the other of said signal processing systems serving to provide motor positioning and drive information.

3. The imaging device of claim 1 further comprising:
   a plurality of said imaging chips, and
   means for independently focusing light on each of said imaging chips.

4. The imaging device of claim 1 wherein: said lens is a planoconcave lens.

5. The imaging device of claim 3 wherein:
   said focusing means includes a plate having at least one aperture per pixel of said imaging chip.

6. The imaging device of claim 3 wherein:
   said imaging chips are arrayed in an arc.

7. The imaging device of claim 6 wherein:
   said arc is 180 degrees.

8. The imaging device of claim 5 wherein:
   said focusing means serves to assure that light passing through said aperture will be aligned perpendicular to said pixel.

9. The imaging device of claim 5 wherein:
   the diameter of said aperture is between one half pixel to 5 pixels.

10. The imaging device of claim 5 wherein:
    the diameter of said aperture is 5-50 microns.

* * * * *